(12) United States Patent
Agirman et al.

(10) Patent No.: US 12,018,875 B2
(45) Date of Patent: Jun. 25, 2024

(54) MOTOR BRAKING FOR AIR CONDITIONING SYSTEM

(71) Applicant: Carrier Corporation, Palm Beach Gardens, FL (US)

(72) Inventors: Ismail Agirman, Southington, CT (US); HanJong Kim, Avon, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/959,618

(22) Filed: Oct. 4, 2022

(65) Prior Publication Data

US 2023/0109540 A1 Apr. 6, 2023

Related U.S. Application Data

(60) Provisional application No. 63/252,377, filed on Oct. 5, 2021.

(51) Int. Cl.
*F25B 49/02* (2006.01)
*F25B 49/00* (2006.01)
*H02P 3/22* (2006.01)
*F16C 32/04* (2006.01)
(Continued)

(52) U.S. Cl.
CPC .......... *F25B 49/025* (2013.01); *F25B 49/005* (2013.01); *H02P 3/22* (2013.01); *F16C 32/044* (2013.01); *F25B 2500/27* (2013.01); *H02P 3/00* (2013.01); *H02P 3/12* (2013.01)

(58) Field of Classification Search
CPC .. F25B 49/025; F25B 49/005; F25B 2500/27; F16C 32/044; H02P 3/00; H02P 3/12; H02P 3/22
See application file for complete search history.

(56) References Cited

U.S. PATENT DOCUMENTS 5,847,533 A * 12/1998 Hakala ............... H02P 6/24
318/803
2003/0057916 A1* 3/2003 Davis ................. H02P 7/04
318/800
2014/0055059 A1 2/2014 Uryu et al.
(Continued)

FOREIGN PATENT DOCUMENTS

CN 1941603 A 4/2007
CN 103155397 A 6/2013
(Continued)

OTHER PUBLICATIONS

JP H09-68222 (English translation) (Year: 1997).*
European Search Report for Application No. 22199429.6; dated Feb. 24, 2023; 6 Pages.

*Primary Examiner* — Jonathan Bradford
(74) *Attorney, Agent, or Firm* — CANTOR COLBURN LLP

(57) ABSTRACT

An air conditioning system including a compressor having a motor; a condenser; an evaporator; a drive providing multiphase, AC output to the motor; a motor braking assembly electrically connected to the drive, the motor braking assembly including at least one switch and at least one braking resistor; wherein the at least one switch is held in an open state by power from the drive; wherein upon disruption of power to the motor, the at least one switch assumes a closed state shorting windings of the motor through the at least one braking resistor.

11 Claims, 3 Drawing Sheets

(51) Int. Cl.
  *H02P 3/00* (2006.01)
  *H02P 3/12* (2006.01)

(56) References Cited

U.S. PATENT DOCUMENTS

2015/0219378 A1* 8/2015 Crane .................. F25B 49/022
                                                   62/201
2019/0288615 A1* 9/2019 Fujii ........................ H02P 3/22

FOREIGN PATENT DOCUMENTS

EP       2816712 A1   12/2014
JP       H0968222 A    3/1997

* cited by examiner

MOTOR BRAKING FOR AIR CONDITIONING SYSTEM

CROSS-REFERENCE TO RELATED APPLICATIONS

This application claims the benefit of Provisional Application No. 63/252,377 filed Oct. 5, 2021, the disclosure of which is incorporated herein by reference in its entirety.

BACKGROUND

Exemplary embodiments of this disclosure pertain generally to motor braking, and more particularly to motor braking for an air conditioning system.

Air conditioning systems typically employ a motor that drives a compressor. The motor may be equipped with an active magnetic bearing assembly that supports a rotor of the motor. If power is lost or the motor drive experiences a fault, power to the active magnetic bearing assembly is disrupted. In such an event, the rotor of the motor can spin backwards due to refrigerant vapor backflow into the compressor. Rotation of the rotor when the active magnetic bearing assembly is unpowered can damage the active magnetic bearing assembly and/or the rotor.

BRIEF DESCRIPTION

According to an embodiment, an air conditioning system including a compressor having a motor; a condenser; an evaporator; a drive providing multiphase, AC output to the motor; a motor braking assembly electrically connected to the drive, the motor braking assembly including at least one switch and at least one braking resistor; wherein the at least one switch is held in an open state by power from the drive; wherein upon disruption of power to the motor, the at least one switch assumes a closed state shorting windings of the motor through the at least one braking resistor.

In addition to one or more of the features described herein, or as an alternative, further embodiments may include wherein the at least one switch comprises three switches and the at least one braking resistor comprises three braking resistors.

In addition to one or more of the features described herein, or as an alternative, further embodiments may include wherein each switch of the three switches is connected to a respective phase of the multiphase, AC output of the drive and each resistor of the three resistors includes a first terminal connected to a respective switch of the three switches.

In addition to one or more of the features described herein, or as an alternative, further embodiments may include wherein each resistor of the three resistors includes a second terminal connected to a common point.

In addition to one or more of the features described herein, or as an alternative, further embodiments may include at least one fuse connected in series between an AC output phase of the drive and the at least one switch.

In addition to one or more of the features described herein, or as an alternative, further embodiments may include three fuses, each fuse connected in series between an AC output phase of the drive and a respective one of the three switches.

In addition to one or more of the features described herein, or as an alternative, further embodiments may include wherein the drive includes a DC bus between a converter and an inverter.

In addition to one or more of the features described herein, or as an alternative, further embodiments may include wherein the at least one switch is connected to a first side of the DC bus, a first terminal of the at least one resistor is connected to the at least one switch and a second terminal of the at least one resistor is connected to a second side of the DC bus.

In addition to one or more of the features described herein, or as an alternative, further embodiments may include a fuse connected in series between first side of the DC bus and the at least one switch.

In addition to one or more of the features described herein, or as an alternative, further embodiments may include an active magnetic bearing assembly supporting a rotor of the motor.

In addition to one or more of the features described herein, or as an alternative, further embodiments may include a drive controller associated with the drive, the drive controller configured to verify that the at least one switch is open prior to powering the motor.

In addition to one or more of the features described herein, or as an alternative, further embodiments may include a sensor configured to detect a test signal to verify that the at least one switch is open prior to powering the motor.

Technical benefits of embodiments of this disclosure include the ability to quickly brake a rotor of a motor during a power loss to protect components of an active magnetic bearing supporting the rotor.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
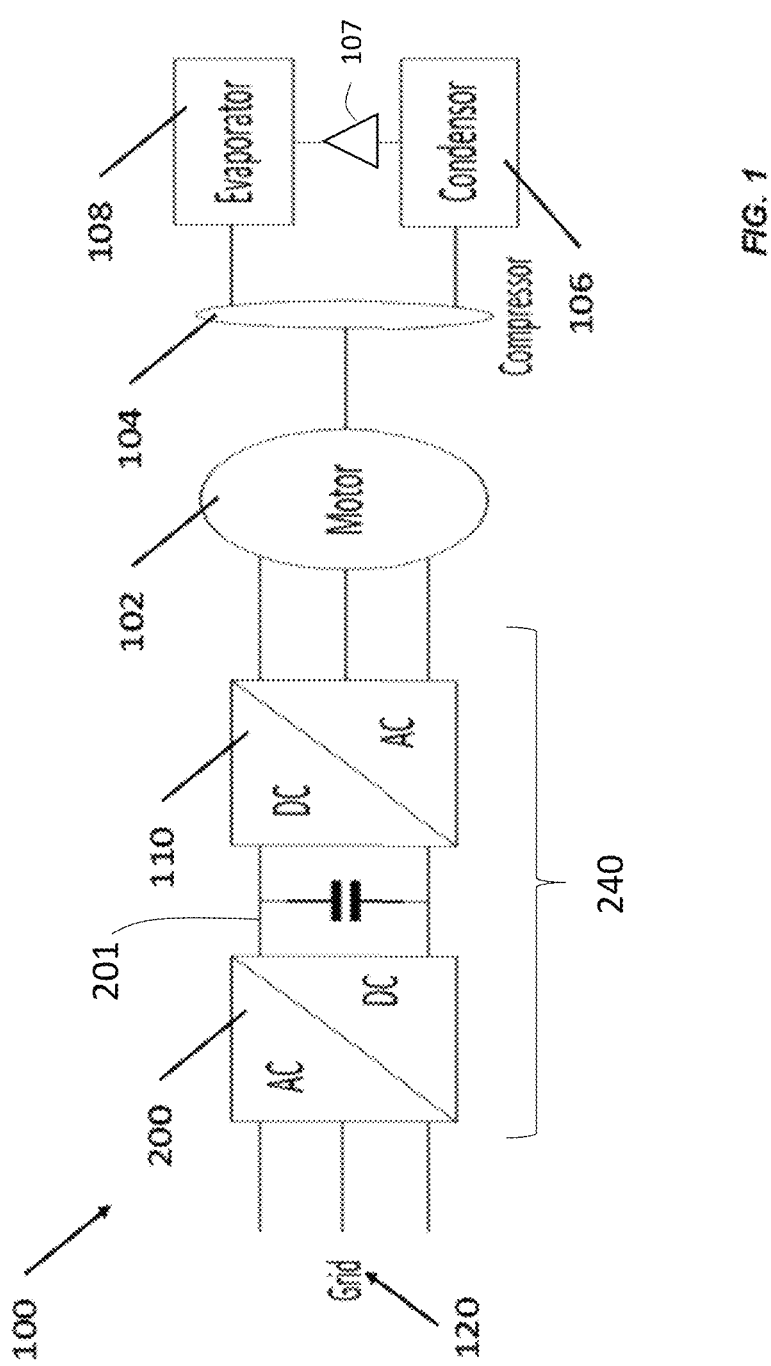
FIG. 1 is a block diagram of an air conditioning system in an example embodiment.

FIG. 1 is a block diagram of air conditioning system 100 in an example embodiment. The air conditioning system 100 may be configured to condition air in a building, such as a chiller, roof top unit, heat pump, etc. The air conditioning system 100 may be configured to condition air for refrigerated environments, such as a refrigerated container, a refrigerated trailer, refrigerator/freezer, etc.

The air conditioning system 100 includes a variable speed motor 102 that is coupled to a compressor 104. The compressor 104 includes an impeller/rotor that rotates and compresses liquid refrigerant to a superheated refrigerant vapor for delivery to a condenser 106. In the condenser 106, the refrigerant vapor is liquefied at high pressure and rejects heat (e.g., to the outside air via a condenser fan in an air-cooled application). The liquid refrigerant exiting condenser 106 is delivered to an evaporator 108 through an expansion valve 107. The refrigerant passes through the expansion valve 107 where a pressure drop causes the high-pressure liquid refrigerant to achieve a lower pressure combination of liquid and vapor. As fluid passes the evaporator 108, the low-pressure liquid refrigerant evaporates, absorbing heat from the fluid, thereby cooling the fluid and evaporating the refrigerant. The low-pressure refrigerant is again delivered to compressor 104 where it is compressed to a high-pressure, high temperature gas, and delivered to condenser 106 to start the refrigeration cycle again. It is to be appreciated that while a specific air conditioning system is shown in FIG. 1, the present teachings are applicable to any air conditioning system.

As shown in FIG. 1, the compressor 104 driven by a variable speed motor 102 from power supplied from a multiphase, AC input voltage 120 (grid or mains) through a drive 240 including an AC-DC converter 200 and a DC-AC inverter 110. The drive 240 may be a variable frequency drive that controls speed of motor 102 using a varying multiphase, AC output voltage. The AC-DC converter 200 includes solid-state electronics to convert the AC input voltage 120 to a DC voltage across a DC bus 201. Such converters 200 are known in the art. The inverter 110 includes solid-state electronics to produce multiphase, AC output voltage. In an embodiment, inverter 110 converts the DC voltage from the converter 200 into a multiphase, AC output voltage, at a desired frequency and/or magnitude in order to drive the multiphase motor 102. Such inverters 110 are known in the art.

Figure 2:
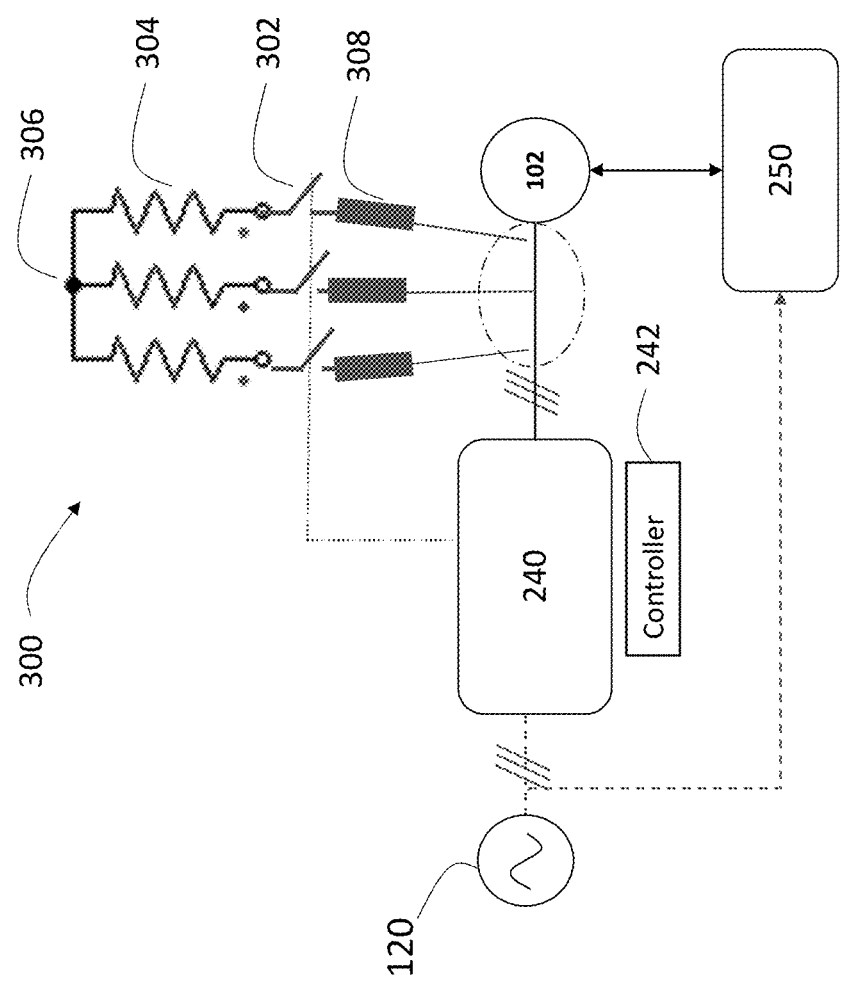
FIG. 2 is a block diagram of components of the air conditioning system including a motor braking assembly in an example embodiment.

FIG. 2 depicts a motor braking assembly 300 for use with the motor 102 and drive 240. The rotor of motor 102 is supported by an active magnetic bearing assembly 250. The active magnetic bearing assembly 250 may be powered by the AC input voltage 120. In situations where power to the motor 102 is interrupted, it is desirable to stop rotation of the rotor of motor 102 promptly. The motor braking assembly 300 provides for quickly stopping rotation of the rotor of motor 102 when power to the motor 102 is interrupted. The interruption of power to the motor 102 may be a result of loss of the AC input voltage 120, a fault in the drive 240 or another cause.

The motor braking assembly 300 includes a plurality of switches 302. The switches 302 are moved by an open, non-conductive state and a closed, conductive state in response to power from the drive 240. The switches 302 may be implemented using relays, transistors, etc. Each switch 302 is connected to a respective phase of the multiphase, AC output of the drive 240 through a fuse 308. As such, each switch 302 is also connected to one phase winding of the motor 102. The motor braking assembly 300 includes a plurality of braking resistors 304. Each braking resistor 304 has a first terminal connected to a respective one of the switches 302. The second terminal of each braking resistor 304 is connected to a common point 306.

Each switch 302 is normally closed, and is held in an open, non-conductive state during normal operation by power from the drive 240. Upon a disruption of power to the motor 102, power to the switches 302 is interrupted. The disruption of power to the motor 102 may be caused by a fault at the AC input voltage 120 or by a fault in the drive 240. This causes the switches 302 to assume a closed, conductive state. This shorts the multiphase windings of motor 102 through the braking resistors 304 to cause the rotor of motor 102 to stop rotating.

Fuses 308 protect the motor windings of motor 102 from being inadvertently shorted through the braking resistors 304 due to a fault in one or more switches 302. Fuses 308 are connected in series between one phase of the drive 240 and a respective one of the switches 302.

The drive 240 may include a drive controller 242. The drive controller 240 may be implemented using a general-purpose microprocessor executing a computer program stored on a storage medium to perform the operations described herein. Alternatively, the drive controller 242 may be implemented in hardware (e.g., ASIC, FPGA) or in a combination of hardware/software. The drive controller 242 may also be part of an air conditioning control system.

The drive controller 242 may verify that the switches 302 are in the correct position prior to powering the motor 102. For example, prior to providing power to the motor 102, the drive controller 242 may generate a test signal on one phase of the multiphase, AC output of the drive 240. If the test signal is not detected by a sensor at the remaining phases of the multiphase, AC output of the drive 240, then the switches 302 are in the open, non-conductive state. This indicates it is safe to provide power to the motor 102. Otherwise, the drive controller 242 can attempt to reset the switches 302 (e.g., provide power on and off signals to the switches 302) and then verify that the switches 302 are in the correct position prior to powering the motor 102.

In another embodiment, the drive controller 242 determines the status of the normally closed, or back contact, of a relay serving as a switch 302. Under normal operation, the resistors 304 should be out of the circuit and the normally closed contact of the relay in an open position. Only in a power loss condition are the resistors 304 in circuit.

Figure 3:
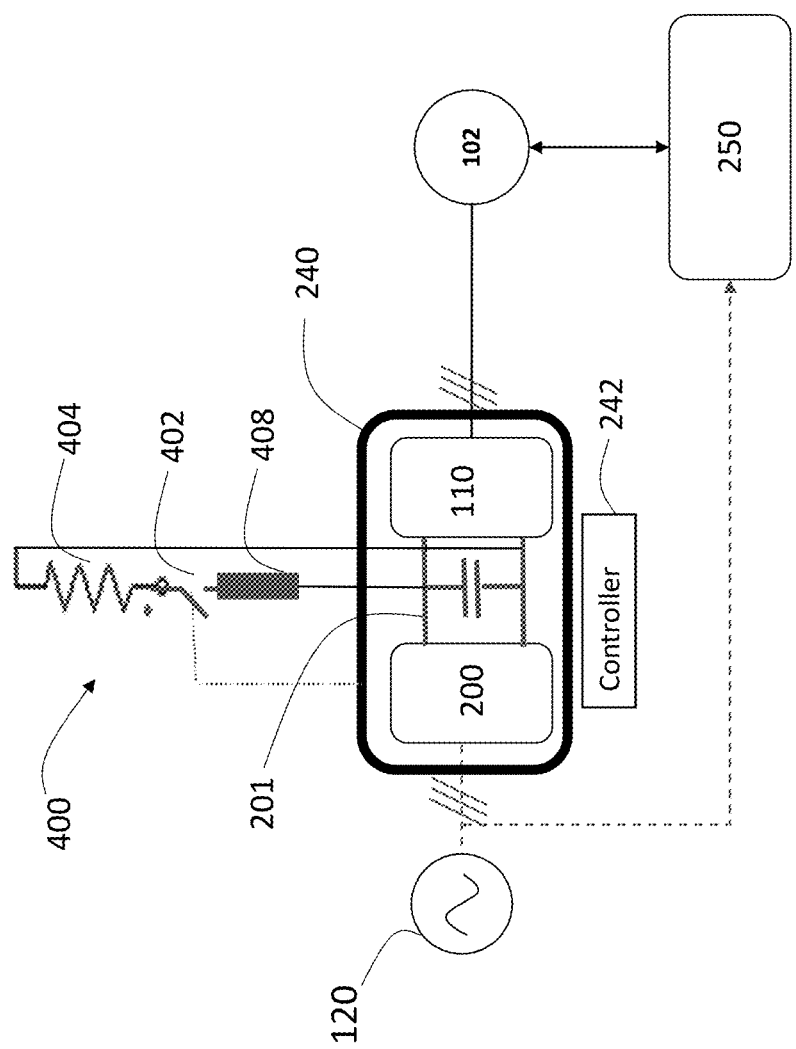
FIG. 3 is a block diagram of components of the air conditioning system including a motor braking assembly in another example embodiment.

FIG. 3 depicts a motor braking assembly 400 in another embodiment. The motor braking assembly 400 is connected across the positive and negative sides of the DC bus 201, between the AC-DC converter 200 and the DC-AC inverter 110. The motor braking assembly 400 includes a switch 402. The switch 402 may be implemented using a relay, transistor, etc. The switch 402 is connected to a first side of the DC bus (e.g., positive) through a fuse 408. The motor braking assembly 400 includes a braking resistor 404. The braking resistor 404 has a first terminal connected to the switch 402. The second terminal of the braking resistor 404 is connected to a second side of the DC bus 201 (e.g., negative).

Switch 402 is normally closed, and is held in an open, non-conductive state during normal operation by power from the drive 24. Upon a disruption of power to the motor 102, power to the switch 402 is interrupted. The disruption of power to the motor 102 may be caused by a fault at the AC input voltage 120 or by a fault in the drive 240. This causes the switch 402 to assume the closed, conductive state. This shorts the multiphase windings of motor 102 through the braking resistor 404 to cause the rotor of motor 102 to stop rotating.

A fuse 408 protects the motor windings of motor 102 from being inadvertently shorted through the braking resistors 404 due to a fault in the switch 402. The fuse 408 is connected in series between one side of the DC bus 201 and the switch 402.

The drive controller 242 may verify that the switch 402 is in the correct position prior to powering the motor 102. For example, prior to providing power to the motor 102, the drive controller 242 may generate a test signal on one side of the DC bus 201. If the test signal is not detected by a sensor at the other side of the DC bus, then the switch 402 is in the open, non-conductive state. This indicates it is safe to provide power to the motor 102. Otherwise, the drive controller 242 can attempt to reset the switch 402 (e.g., provide power on and off signals to the switch 402) and then verify that the switch 402 is in the correct position prior to powering the motor 102.

In another embodiment, the drive controller 242 determines the status of the normally closed, or back contact, of a relay serving as a switch 402. Under normal operation, the resistors 404 should be out of the circuit and the normally closed contact of the relay in an open position. Only in a power loss condition are the resistors 404 in circuit.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air conditioning system comprising:
   a compressor having a motor;
   a condenser;
   an evaporator;
   a drive configured to be powered by an AC input voltage and providing multiphase, AC output to the motor;
   an active magnetic bearing assembly supporting a rotor of the motor, the active magnetic bearing assembly configured to be powered by the AC input voltage; and
   a motor braking assembly electrically connected to the drive, the motor braking assembly including at least one switch and at least one braking resistor;
   wherein the at least one switch is held in an open state by power from the drive; and
   wherein upon disruption of the AC input voltage, interrupting power to the drive and the active magnetic bearing assembly, the at least one switch assumes a closed state shorting windings of the motor through the at least one braking resistor.

2. The air conditioning system of claim 1, wherein the at least one switch comprises three switches and the at least one braking resistor comprises three braking resistors.

3. The air conditioning system of claim 2, wherein each switch of the three switches is connected to a respective phase of the multiphase, AC output of the drive and each resistor of the three resistors includes a first terminal connected to a respective switch of the three switches.

4. The air conditioning system of claim 3, wherein each resistor of the three resistors includes a second terminal connected to a common point.

5. The air conditioning system of claim 1 further comprising at least one fuse connected in series between an AC output phase of the drive and the at least one switch.

6. The air conditioning system of claim 3 further comprising three fuses, each fuse connected in series between an AC output phase of the drive and a respective one of the three switches.

7. The air conditioning system of claim 1 wherein the drive includes a DC bus between a converter and an inverter.

8. The air conditioning system of claim 7 wherein the at least one switch is connected to a first side of the DC bus, a first terminal of the at least one resistor is connected to the at least one switch and a second terminal of the at least one resistor is connected to a second side of the DC bus.

9. The air conditioning system of claim 7 further comprising a fuse connected in series between the first side of the DC bus and the at least one switch.

10. The air conditioning system of claim 1, further comprising a drive controller associated with the drive, the drive controller configured to verify that the at least one switch is open prior to powering the motor.

11. The air conditioning system of claim 10, further comprising a sensor configured to detect a test signal to verify that the at least one switch is open prior to powering the motor.

* * * * *